(12) United States Patent
Welsh et al.

(10) Patent No.: US 7,433,838 B2
(45) Date of Patent: Oct. 7, 2008

(54) REALIZING LEGALLY BINDING BUSINESS CONTRACTS THROUGH SERVICE MANAGEMENT MODELS

(75) Inventors: David Welsh, Kirkland, WA (US); Frederick C. Chong, Kirkland, WA (US); James D. Clark, Conroe, TX (US); Max G. Morris, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 507 days.

(21) Appl. No.: 11/153,652

(22) Filed: Jun. 15, 2005

(65) Prior Publication Data

US 2006/0111926 A1 May 25, 2006

Related U.S. Application Data

(60) Provisional application No. 60/629,867, filed on Nov. 19, 2004.

(51) Int. Cl.
*G06Q 40/00* (2006.01)
(52) U.S. Cl. ...................................................... 705/35
(58) Field of Classification Search .................... 705/35
See application file for complete search history.

(56) References Cited

U.S. PATENT DOCUMENTS

| | | | |
|---|---|---|---|
| 5,794,207 A * | 8/1998 | Walker et al. .................. 705/1 |
| 6,338,050 B1 * | 1/2002 | Conklin et al. ................. 705/80 |
| 2001/0011282 A1 * | 8/2001 | Katsumata et al. .......... 707/505 |
| 2002/0078130 A1 * | 6/2002 | Thornton et al. ............. 709/201 |
| 2003/0028393 A1 * | 2/2003 | Coulston et al. ................ 705/1 |
| 2003/0036994 A1 * | 2/2003 | Witzig et al. ................... 705/38 |
| 2003/0200168 A1 * | 10/2003 | Cullen et al. ................... 705/37 |
| 2003/0220863 A1 * | 11/2003 | Holm et al. .................... 705/37 |
| 2003/0229618 A1 * | 12/2003 | Judy ............................... 707/1 |

OTHER PUBLICATIONS

Man-Sze Li, Semantic Interoperability at Work, Jun. 22-23, 2004, e-Government Workshop, Bronnoysund, Norway.*
Web Service Level Agreement (WSLA), Heiko Ludwig et al., 2001, IBM Corporation.*

* cited by examiner

*Primary Examiner*—Hani M. Kazimi
*Assistant Examiner*—Robert R Niquette
(74) *Attorney, Agent, or Firm*—Workman Nydegger (57) ABSTRACT

Methods and apparatus for managing business interactions between opposing parties. Business interactions are mapped to service contracts. The service contracts are mapped to machine readable code. The machine readable code is defined by business transaction patterns and service interaction patterns. The machine readable code is consumed by an IT system. Management tasks associated with fulfilling obligations required by the business interactions are generated.

18 Claims, 5 Drawing Sheets

| | Time To Acknowledge Receipt 302 | Time To Acknowledge Acceptance 304 | Time To Perform 306 | Authorization Required 308 | Non-repudiation Of Origin And Content 310 | Non-repudiation Of Receipt 312 | Recurrence 314 |
|---|---|---|---|---|---|---|---|
| Business Transaction | Time Interval | Time Interval | Time Interval | True | True | True | Number |
| Request/Confirm | NULL | NULL | Time Interval | False | False | True | Number |
| Request/Response | NULL | NULL | Time Interval | False | False | NULL | Number |
| Query/Response | NULL | NULL | Time Interval | False | False | NULL | Number |
| Notification | Time Interval | NULL | Time Interval | False | True | True | Number |
| Information Distribution | Time Interval | NULL | Time Interval | False | False | False | Number |

Business Requesting Activity Property Values

*Fig. 3*

| | Time To Acknowledge Receipt | Time To Acknowledge Acceptance | Time To Perform | Authorization Required | Non-repudiation Of Origin And Content |
|---|---|---|---|---|---|
| Business Transaction | Time Interval | Time Interval | Time Interval | True | True |
| Request / Confirm | Time Interval | NULL | Time Interval | True | False |
| Request / Response | NULL | NULL | Time Interval | False | False |
| Query / Response | NULL | NULL | Time Interval | False | False |
| Notification | Time Interval | NULL | Time Interval | False | False |
| Information Distribution | Time Interval | NULL | Time Interval | False | False |

Responding Business Activity Property Values

REALIZING LEGALLY BINDING BUSINESS CONTRACTS THROUGH SERVICE MANAGEMENT MODELS

CROSS-REFERENCE TO RELATED APPLICATIONS

This application claims the benefit of U.S. Provisional Application No. 60/629,867, titled REALIZING LEGALLY BINDING BUSINESS CONTRACTS THROUGH SERVICE MANAGEMENT MODELS filed Nov. 19, 2004, which is incorporated herein by reference.

BACKGROUND OF THE INVENTION

1. The Field of the Invention

The invention generally relates to modeling business transactions and business management tasks. More specifically, the invention relates to creating machine readable code describing business transactions that can be used by IT systems to facilitate business management tasks.

2. Description of the Related Art

Modern business includes two very important aspects, namely business management and IT. Business management includes the day to day activities oz performed to successfully operate the business. For example, business management may include advertising, sales, negotiations and making contracts, fulfilling contractual obligations, managing obligations owed to the business by other parties and the like. Some business interactions result in residual obligations once undertaken. For example, entering into a binding contract results in residual obligations that must be performed by a party entering into a contract. These obligations may be defined explicitly in the contract or exist by operation of law. There is a need in business management to ensure that obligations are met. Management tasks such as tracking tasks, generating performance indicators and the like should be performed to ensure that obligations are met.

IT has previously heretofore been a useful tool for businesses performing business functions. For example, IT can be used to draft contracts, transmit contracts to opposing parties, negotiate with opposing parties, confirm obligations, manage inventory, perform marketing tasks and the like. IT may also be used to track tasks and generate performance indicators.

Business management and IT are typically interfaced on an ad hoc (for a specific purpose) basis. Specifically, typically the needs of a particular business are evaluated and IT is designed and implemented to meet those particular needs. Thus, often when a business seeks to expand or generate new sources of revenue, additional IT must be developed and implemented to perform new functions. This can be expensive and time consuming so as to negate at least a portion of any competitive advantage realized by expanding or generating new sources of revenue.

Therefore, it would be useful to implement an IT system that can generate and perform management tasks based on input of data related to business interactions.

BRIEF SUMMARY OF THE INVENTION

One embodiment includes a method of managing business interactions between opposing parties. The method includes mapping the business interactions to one or more service contracts. The method further includes mapping the one or more service contracts to machine readable code. The machine readable code is defined by one or more business transaction patterns and one or more service interaction patterns. The machine readable code is consumed in an IT system. The method further includes generating management tasks associated with fulfilling obligations required by the business interactions.

Another embodiment includes a computer readable medium having computer executable instructions. The computer executable instructions are designed to facilitate the performance of various acts. The acts include mapping the business interactions to one or more service contracts. The acts further include mapping the one or more service contracts to machine readable code defined by one or more business transaction patterns and one or more service interaction patterns. The machine readable code is consumed in an IT system. The acts facilitated by the computer executable instructions include generating management tasks associated with fulfilling obligations required by the business interactions.

Yet another embodiment includes a computer readable medium including a number of data fields. The data fields form an IT system consumable model of a service contract. The computer readable medium includes a service implementation. The service implementation includes service policies, service settings, and service instrumentation. The service instrumentation includes: events defining tasks to be performed, traces providing data for debugging and diagnostics, probes, and performance counters defining system health events. The computer readable medium further includes a service commitment. The service commitment has service operation rules and service fulfillment rules. The service operation rules and service fulfillment rules include parameters, conditions reflecting the terms and conditions specified in the service contract, and actions. The actions include at least one of alerts and emails that trigger management tasks based on data from the service instrumentation.

The embodiments summarized above allow for IT systems to be quickly adapted for use with changing business interactions. This allows for a business entity to efficiently utilize resources when performing business tasks or exploring new areas of business opportunity.

These and other advantages and features of the present invention will become more fully apparent from the following description and appended claims, or may be learned by the practice of the invention as set forth hereinafter.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

In one embodiment, business contracts and other interactions between parties are mapped using business transaction patterns and service interaction patterns to form one or more service contracts to implement a service oriented model. The service oriented model allows for building a distributed system. Service contracts include information describing management tasks that are to be performed to fulfill contractual obligations or meet other obligations required by various transactions. Presently, business contracts and transactions can be described using one or more business transaction patterns. The embodiment makes use of a finite number of business transaction patterns that are used to model business contracts and transactions. In addition, the embodiment uses a finite number of management activities used in varying combinations to fulfill obligations specified in a service contract.

Thus, the service contracts may be modeled using the business transaction patterns and service interaction patterns. The business transaction patterns may be described in terms of a machine readable code block with the finite number of management tasks being used as parameters of the machine readable code block. By way of example and not limitation, an XML code block such as is used in Web Services Description Language (WSDL), may be used to set forth the terms and conditions of a service contract.

Business processes and transactions between opposing parties can be modeled using one or more specific bilateral transaction patterns. Presently, there are six bilateral transaction patterns that have found widespread recognition. These patterns include: (1) an offer and acceptance pattern; (2) a query/response pattern, (3) a request/response pattern, (4) a request/confirm pattern, (5) an information distribution pattern, and (6) a notification pattern.

An offer and acceptance pattern results in residual obligations for each party to fulfill. After an offer and acceptance transaction is complete, each party has commitments (residual obligations) to fulfill. For example, a first party may offer to sell a good at a particular price. The second party accepts the offer. So long as various legal requirements have been met as to the sufficiency of the offer and the acceptance, the first party is now obligated to deliver the goods, while the second party is obligated to pay the specified price. Specifically, the offer and acceptance pattern requires an acknowledgement of a business activity message once the business activity message passes a validation test. The acknowledgement may be substantive and include terms of an acceptance, or may be non-substantive and contain a general, auditable business signals.

A query/response pattern is used to model a query for information from one party to the opposing party that has the information. Once a query/response transaction has taken place, there is no residual obligation on either party. One example might include a first party submitting a query for information describing products for sale by a second party. The second party may respond to the query by sending a catalog with product descriptions. This pattern does not permit the return of auditable business signals, receipt acknowledgement, or business acceptance acknowledgement.

A request/response pattern is used to model a formal request for information that an opposing party has. This pattern results in a residual obligation to one of the parties. For example, a first party may request a quote for goods or services from a second party. The second party then supplies the quote, which results in an offer to sell. The second party now has a residual obligation to hold the offer open for a reasonable amount of time, to withdraw the offer to sell, or other such obligations.

A request/confirm pattern is used to model a request for confirmation or status of some obligation existing from a previously established contract or to an opposing parties business rules. For example, one party may request a status update of a delivery to ensure that the opposing party is not repudiating obligations or is able to fulfill obligations.

An information distribution pattern is used to model an informal information exchange. This informal exchange does not result in non-repudiation requirements. Many marketing activities are examples of information distributions.

A notification pattern is used to model a formal information exchange. The formal exchange results in non-repudiation requirements. An example of a notification pattern includes tracking parcel post movements.

Each of the six business transactions patterns described above can be further modeled by specific service management tasks. Each of the management tasks describes actions that should take place for the transaction to be complete. In one embodiment, there is a reliance on a finite set of management tasks. Thus, using a finite set of business transaction patterns, and a finite set of management tasks, virtually any business interaction can be modeled. This model can be serialized in a machine readable code usable by an IT system.

By way of example, the notification pattern includes the following tasks: gathering information; verifying the accuracy of the information; attesting to the accuracy of information; and transmitting the information. Gathering the information, may include gathering information to determine the location of a particular parcel post package. For example, a user may search a database where bar code scanning is used to enter location information. Verifying the information may include steps to assure that the gathered information is accurate. For example, a responsible individual may physically inspect the package. Attesting to the accuracy of the information involves making a statement that the information is accurate. For example, the responsible individual may send a letter or email stating the location of the package. Transmitting the information includes forwarding the information to an opposing party. For example, the letter or email is sent to the opposing party. Each of the other business transaction patterns includes other various service management tasks.

While the above description has been framed using one very specific example, those of skill in the art will recognize that other acts may fulfill: gathering information; verifying the accuracy of the information; attesting to the accuracy of information; and transmitting the information. Other business transaction patterns include other management tasks to be performed.

Figure 1:
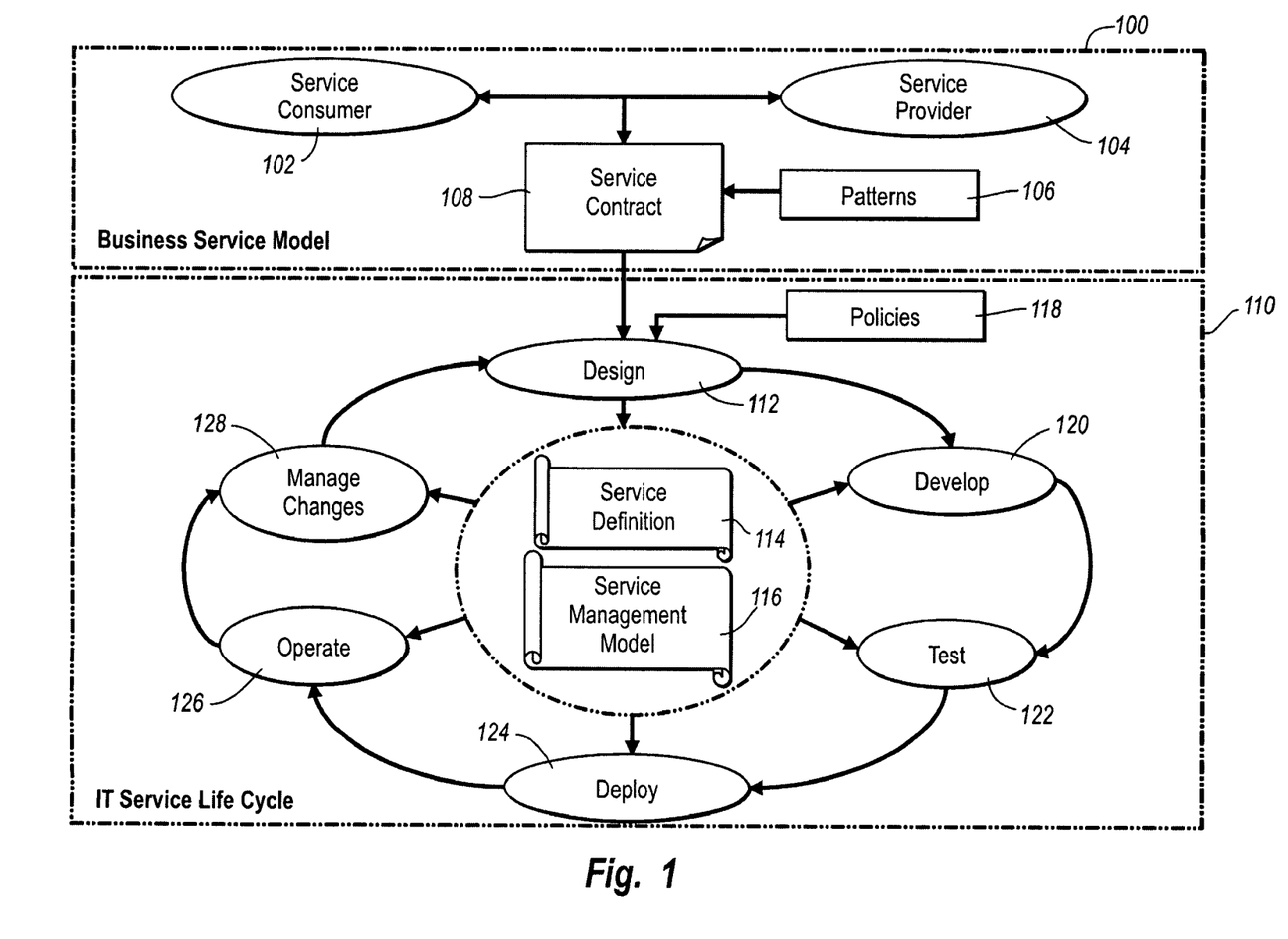
FIG. 1 illustrates the interaction of a business service model and an IT service lifecycle in accordance with various aspects of the present invention.

Referring now to FIG. 1, business interactions between a service consumer 102 and a service provider 104 are illustrated as part of a Business Service Model 100. In a service oriented model, a service provider can include any one of a number of different services or organizations. For example, and not by way a limitation, service providers can be internal, such as a mainframe application, printer, internal employees and the like. Service providers can be external, such as shipping companies, dock clerks, goods suppliers, and the like. Service providers expose their capabilities through interfaces. As described previously, interactions between a service consumer 102 and a service provider 104 can be modeled using one or more business transaction patterns and one or more service interaction patterns. The one or more business transaction patterns and one or more service interaction patterns are shown in FIG. 1 as patterns 106. The patterns 106 are used to transform business interactions into one or more service contracts 108. The information in the service contract 108 may be organized, in one example, as a form document.

Notably, the service contract 108 as shown herein does not necessarily translate directly to terms and/or conditions of an actual business contract. While an actual business contract may be used to form the service contract 108, other information, such as specific regulatory or common law requirements, while not explicit in the actual business contract, may be explicitly stated in the service contract. These requirements may be provided by the patterns input 106 shown in FIG. 1. In one embodiment, the patterns input 106 includes standardized legal requirements or best business practices such as those codified in UNECE UN/CEFACT Modeling Methodology (UMM) Revision 10, ISO/IEC JTC1 SC32 WGI Business Agreement Semantic Descriptive Techniques ISO/IEC FCD 15944-3, and the like. Additionally, organizations like the American Bar Association, the International Chamber of Commerce, and the United Nations have formalized international rules governing commercial transactions. These rules may be included in the patterns input 106. The patterns input 106 may also include, for example, rules realized by experience with electronic document interchange or other business interaction experience.

Other business interactions that are not necessarily based on business contracts may also be used to form a service contract 108. For example, service contracts 108 may be used to describe requests for quotes, requests for catalogs, confirmation of shipment and delivery, etc. In summary, a service contract 108 defines various parameters that the service consumer 102 and service provider 104 agree to. These parameters can include, for example, response time, time-out, and availability; development, test, and production environments; priorities and keywords; and legal enforceability requirements.

When organized as a form document, it is an easy task to transform the service contract 108 into machine readable code that is consumed by an IT system. The machine readable code may be used in an IT Service Life Cycle 110. In the design phase 112 of the IT service Life Cycle 110, the service contract 108 is used to form a service definition 114 and a service management model 116. The service management model 116 may also be referred to as a health model. The service definition 114 and service management model 116 are used throughout the remainder of the IT Service Lifecycle 110 to facilitate performance of management tasks required in fulfilling obligations specified in the service contract.

At the design phase 112, a designer should consider the functional needs of business users using the system and the non-functional attributes that allow services to be operated, maintained and upgraded over time. When designing the service management model 116 several issues should be considered. A designer should consider, for example, the service configuration, including system and network parameters; the message security policies and business rules, identities and entitlements; the service composition; the roles of directory services including managing security data (credentials and entitlements) and managing service configuration and policies; consistency with infrastructure; and operational processes.

Figure 2:
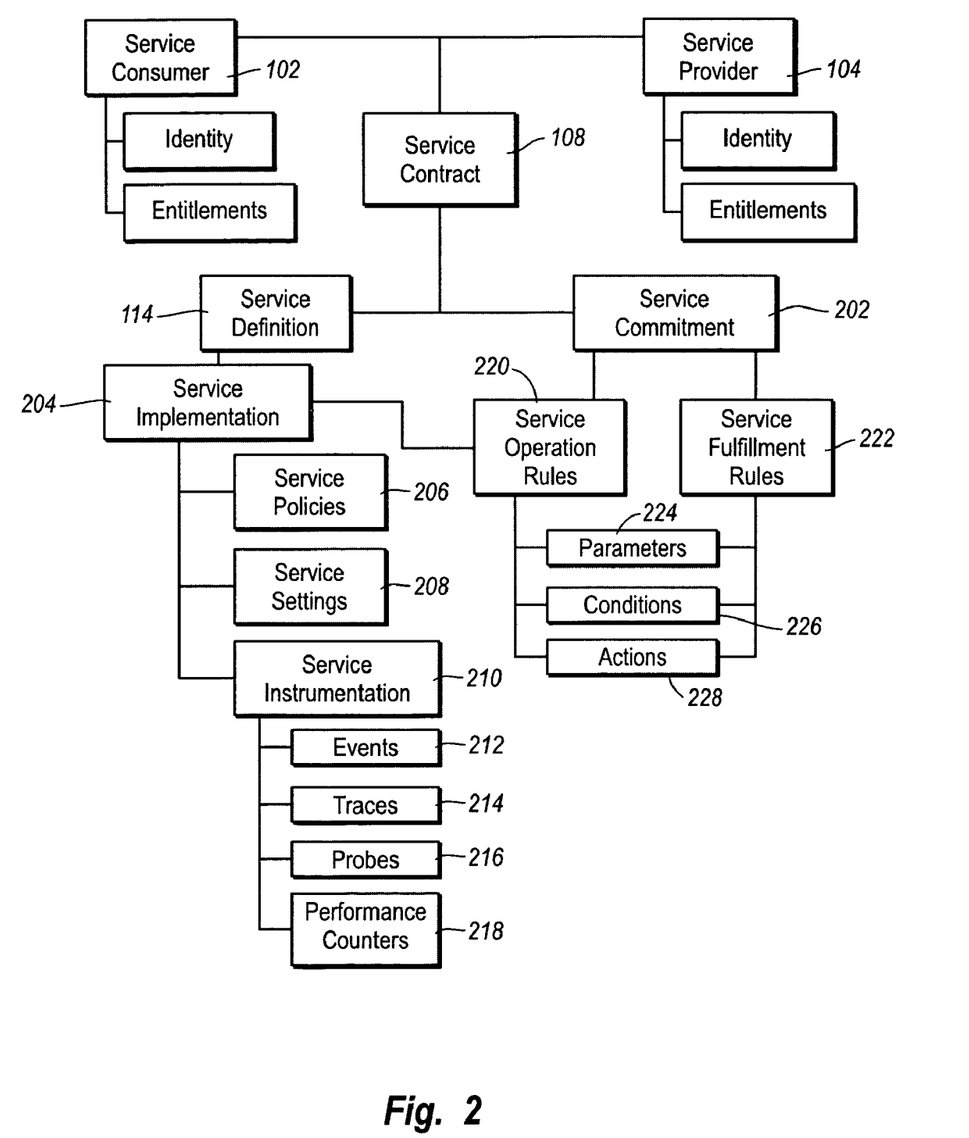
FIG. 2 illustrates a block diagram showing the interaction of various IT components to facilitate the performance of management tasks.

Referring now to FIG. 2, the service definition 114 operation is more fully explored. FIG. 2 further illustrates a service commitment 202 which may be a portion of the service management model 116 shown in FIG. 1. FIG. 2 illustrates that the Service definition 114 defines service implementation 204, which is further defined by service policies 206, service settings 208, and service instrumentation 210. The service instrumentation further defines events 212, traces 214, probes 216 and performance counters 218.

The events 212, traces 214, probes 216 and performance counters 218 generate data that can be used by the service management model 116 (FIG. 1). Specifically, the events 212 define management events defining tasks that need to be performed. The traces 214 provide data for debugging and diagnostics of the system. The performance counters 218 shows if the system is performing healthily. The probes 216 are internal service states that can be queried and controlled by management applications.

The service commitment 202 includes various rules that consume the data generated by the service implementation 204. The service commitment 202 includes service operation rules 220 and service fulfillment rules 222. The rules have parameters 224 conditions 226 and actions 228. The conditions 226 reflect the terms and conditions specified in the service contract 108. The actions 228 may include items such as alerts, emails and the like that trigger management tasks based on the data from the service instrumentation 210.

Referring again to FIG. 1, the service management model 116, while shown here as a single model, may in one embodiment include a number of different models. For example, the service management model 116 may include a health model which includes technical service health, a configuration model that describes settings that can be changed for the technical services, a service level management model that models business events and data that needs to be captured and the rules that consume the data, etc.

With continued reference to FIG. 1, the service definition 114 and service management model 116 are used as inputs to the other stages of the IT service life cycle 110. At the development phase 120, instrumentation data from the service instrumentation 210 (FIG. 2) that has been identified in the design phase 112 is codified in program code. Specifically, during the development phase 120, several issues are addressed. These issues include making the application testable, making the application deployable and configurable, dealing with versioning, dealing with security, writing the application to expose events 212 (FIG. 2), writing the application to handle health instructions or probes 216 (FIG. 2), and handling deprecation.

During the testing phase 122, tests are run against the service management model 116 parameters defined by the service commitment 202 (FIG. 2). Specifically, during the test phase 122, testing is performed to verify that an application will comply with governance. The application may be subjected to testing including functional performance, stress testing, and security penetration. Issues that are addressed during the testing phase 122 include: unit testing; datacenter deployability; service contract conformance; and manageability.

During the deployment phase 124, there is a need to set configuration data according to what is contained in the service management model 116. To deploy the application, the network infrastructure, hardware and operating systems may be prepared. The application is then deployed to a production environment. Issues addressed during the deployment phase 124 include provisioning; versioning; discoverability; windowing of update rollout; cluster management; and integration with infrastructure change management.

At the operation phase 126, all the service instrumentation 210 (FIG. 2) and rules in the service commitment 202 (FIG. 2) come in to play to make sure that items such as health and performance are within acceptable limits. At the operation phase 126, other issues include root-cause analysis, metering and billing, and service control configuration. The operation phase 126 makes use of the service management model 116 and service definition 114 to ensure that any business anomalies are handled correctly.

The manage changes phase 128 uses the service definition 114 and service management model 116 such that if there are changes to the technical service, such as if there is a new version of the service that needs to be released, the changes are managed so that the same level of business service is provided. The manage changes phase 128 may address issues such as service contract metrics; deprecation; and infrastructure adjustments for scaling.

While a single IT service life cycle 110 is illustrated in FIG. 1, those of skill in the art will understand that more than one IT service life cycle 110 may be implemented within the scope of embodiments described herein. For example, the service consumer 102 and service provider 104 may each implement aspects of the invention in each their own IT system. As such, the particular features and requirements of each IT system should be taken into account and may be represented by parallel but distinct IT service life cycles 110.

Similarly, while the business service model 100 shown in FIG. 1 does not explicitly show a life cycle including design, develop, test, deploy, operate, and manage changes phases as are shown in the IT service life cycle 110, the same or similar phases may be implemented in the business service model 100. Understandably, there may be need or desire to change or fine-tune business operations. A life cycle, such as the IT service life cycle 110, may be implemented as part of a business model to facilitate changes or fine-tuning. Just as each party, service consumer 102 and service provider 104, may implement each their own IT service life cycle 110, each party may also implement each their own business life cycle. Each business will likely have individualized resources, constraints, challenges etc., that will be taken into account in each their own business life cycle.

As noted in FIG. 1, a policies input 118 is used in the transformation from service contract 108 to service definition 114 and service management model 116. This policies input 118 may be used to help define specific details of the service definition 114 and the service management model 116. For example, the policies input 118 may contain a directory listing entities and associated roles. Thus, if an individual with a given role is required to perform a given management task, the service management model 116 may include the specific information required. For example, if the service contract requires that a director of the company provide a weekly status update, the service management model 116 includes information identifying specific individuals with the role of director and specifies actions to alert one or more of those individuals to the weekly requirement. As mentioned previously, the information is able to be formed into the service management model 116 using the service contract 108 and the policies input 118.

The service management model 116 in one embodiment is a serialized data block describing management tasks. For example, the management model may describe tasks that have to be done, times when the tasks have to be done, tracking to ensure that tasks are done, etc. The service management model 116 may further include information indicating if a task must be signed, what types of signatures and/or certificates need to be used, what roles need to sign, etc. The service management model 116 may also include health modeling, life cycle, etc.

Health modeling defines what is meant by a system to be healthy (operating within normal conditions) or unhealthy (failed or degraded). To keep an application running, the applications health metrics are monitored, symptoms of a problem are detected, the cause of the problem is diagnosed, and the problem is fixed, preferably before the application performs unacceptably. To accomplish this, the right information is provided about the application at the right time; steps are identified to detect, verify, diagnose, and recover from a degraded operational condition; code is written that automates these steps; and behaviors are documented along with transitions and dependencies of the application.

In one specific embodiment, and without limitation to other embodiments, the service definition 114 and service management model 116 may be embodied as serialized machine readable code such as an XML document. This serialized machine readable code may be, for example, a WSDL document for use in web services applications.

Figure 3:
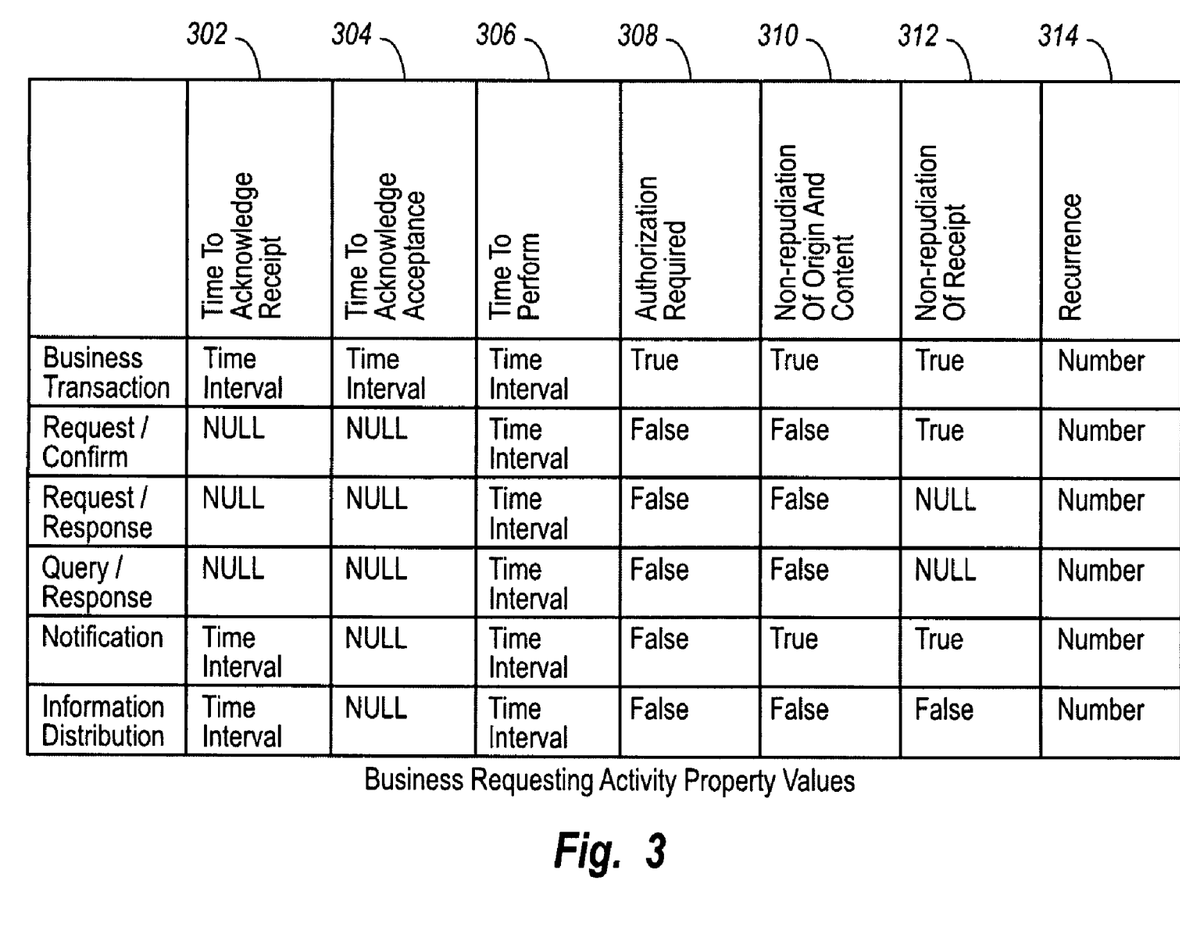
FIG. 3 illustrates a table showing property values for messages for requesting business activities.
Figure 4:
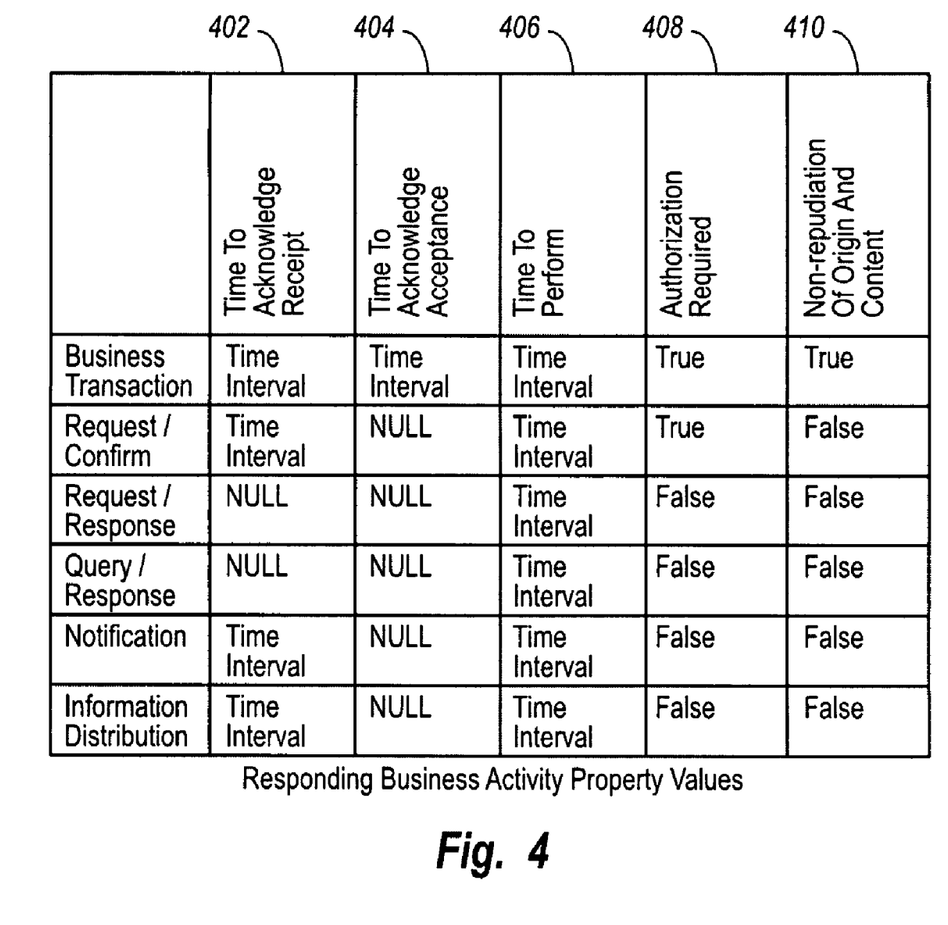
FIG. 4 illustrates a table showing property values for messages for responding business activities.

Referring now to FIGS. 3 and 4, two tables are illustrated that include property values that may be implemented in a serialized machine readable code including parameters from the service contract. The property values are shown in columns where the business transaction patterns are shown in the rows. Specifically, FIG. 3 illustrates property values included in the serialized machine readable code for requesting business activities. FIG. 4 illustrates property values included in the machine readable code for responding business activities.

Referring now to FIG. 3, a service provider of a business transaction provides parameters including: (a) time to acknowledge receipt (column 302), (b) time to acknowledge acceptance (column 304), (c) time to perform (column 306), (d) authorization required (column 308), (e) non-repudiation of origin and content (column 310), (f) non-repudiation of receipt (column 312) and (g) recurrence (column 314).

Time to acknowledge receipt (column 302), when specified (i.e. not NULL), includes a value specifying a time interval. This time interval represents both parties agreement to verify a requesting business document within the time interval.

Time to acknowledge acceptance (column 304), when specified, includes a value specifying a time interval. This time interval represents both parties agreement for a business acceptance document to be returned by the responding party after the requesting business document passes a set of business rules.

Time to perform (column 306) includes a value specifying a time interval. The time interval represents the overall time both parties agree to perform a total business interaction.

Authorization required (column 308) includes a binary TRUE or FALSE value. When the value is TRUE, the identity of the sending role is verified.

Non-repudiation of origin and content (column 310) includes a binary TRUE or FALSE value. When the value is TRUE, a business activity stores the business document in its original form.

Non-repudiation of receipt (column 312), when specified, includes a binary TRUE or FALSE value. When the value is TRUE, both parties agree to mutually verify receipt of a requesting business document.

Recurrence (column 314) includes a numerical value specifying a predetermined number of times attempts at a transmission is made. This value represents an agreement to the number of times to retry a transaction when a time out exception condition is signaled.

Referring now to FIG. 4, a service consumer of a business transaction provides parameters including: (a) time to acknowledge receipt (column 402), (b) time to acknowledge acceptance (column 404), (c) time to perform (column 406), (d) authorization required (column 408), and (e) non-repudiation of origin and content (column 410).

Time to acknowledge receipt (column 402), when specified (i.e. not NULL), includes a value specifying a time interval. This time interval represents both parties agreement to verify a requesting business document within the time interval.

Time to acknowledge acceptance (column 404), when specified, includes a value specifying a time interval. This time interval represents both parties agreement for a business acceptance document to be returned by the responding party after the requesting business document passes a set of business rules.

Time to perform (column 406) includes a value specifying a time interval. The time interval represents the overall time both parties agree to perform a total business interaction.

Authorization required (column 408) includes a binary TRUE or FALSE value. When the value is TRUE, the identity of the sending role is verified.

Non-repudiation of origin and content (column 410) includes a binary TRUE or FALSE value. When the value is TRUE, a business activity stores the business document in its original form.

Figure 5:
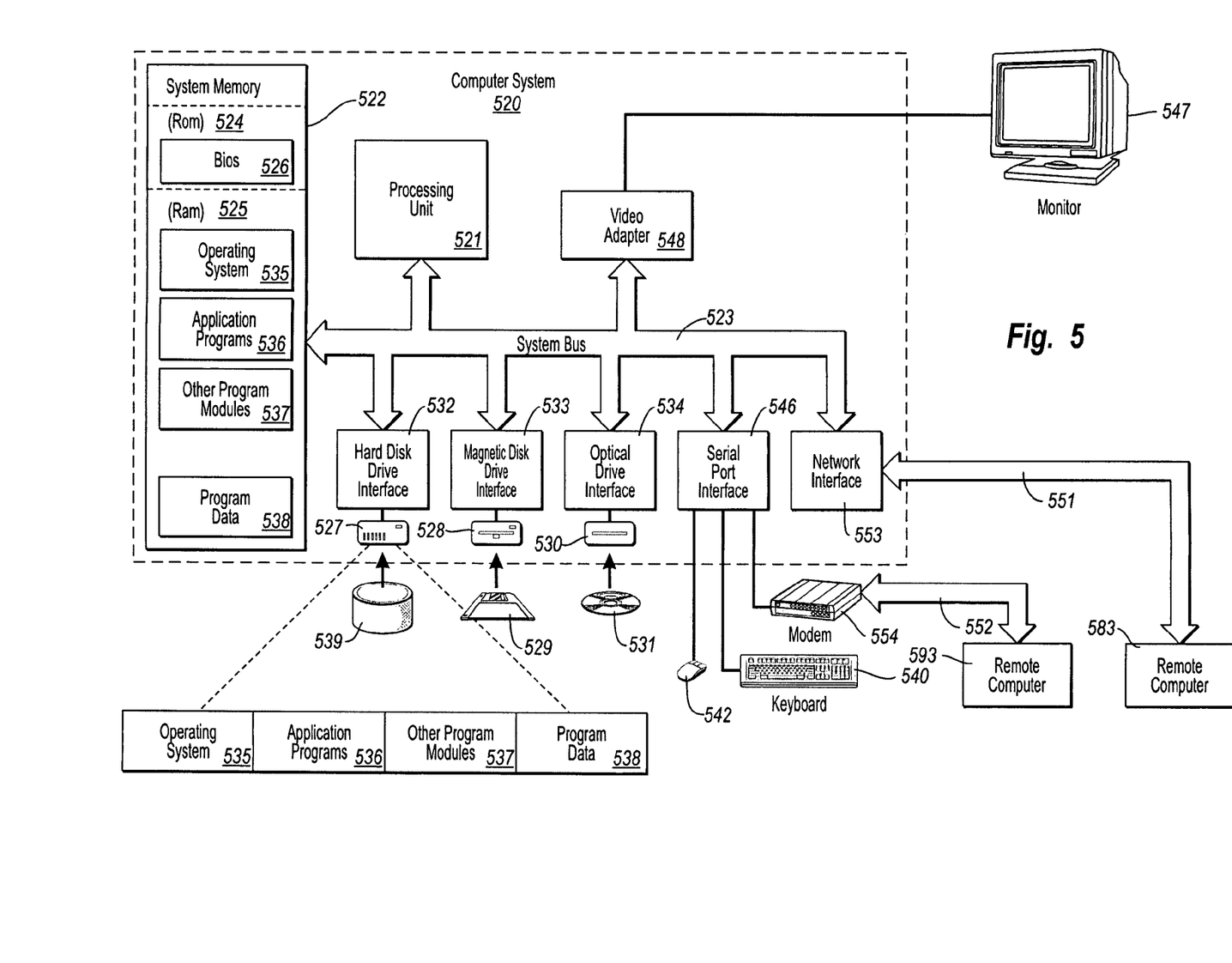
FIG. 5 illustrates one typical system where aspects of the invention may be practiced.

With reference to FIG. 5, an exemplary system for implementing the invention includes a general purpose computing device in the form of a conventional computer 520, including a processing unit 521, a system memory 522, and a system bus 523 that couples various system components including the system memory 522 to the processing unit 521. The system bus 523 may be any of several types of bus structures including a memory bus or memory controller, a peripheral bus, and a local bus using any of a variety of bus architectures. The system memory includes read only memory (ROM) 524 and random access memory (RAM) 525. A basic input/output system (BIOS) 526, containing the basic routines that help transfer information between elements within the computer 520, such as during start-up, may be stored in ROM 524.

The computer 520 may also include a magnetic hard disk drive 527 for reading from and writing to a magnetic hard disk 539, a magnetic disk drive 528 for reading from or writing to a removable magnetic disk 529, and an optical disk drive 530 for reading from or writing to removable optical disk 531 such as a CD-ROM or other optical media. The magnetic hard disk drive 527, magnetic disk drive 528, and optical disk drive 530 are connected to the system bus 523 by a hard disk drive interface 532, a magnetic disk drive-interface 533, and an optical drive interface 534, respectively. The drives and their associated computer-readable media provide nonvolatile storage of computer-executable instructions, data structures, program modules and other data for the computer 520. Although the exemplary environment described herein employs a magnetic hard disk 539, a removable magnetic disk 529 and a removable optical disk 531, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 539, magnetic disk 529, optical disk 531, ROM 524 or RAM 525, including an operating system 535, one or more application programs 536, other program modules 537, and program data 538. A user may enter commands and information into the computer 520 through keyboard 540, pointing device 542, or other input devices (not shown), such as a microphone, joy stick, game pad, satellite dish, scanner, or the like. These and other input devices are often connected to the processing unit 521 through a serial port interface 546 coupled to system bus 523. Alternatively, the input devices may be connected by other interfaces, such as a parallel port, a game port or a universal serial bus (USB). A monitor 547 or another display device is also connected to system bus 523 via an interface, such as video adapter 548. In addition to the monitor, personal computers typically include other peripheral output devices (not shown), such as speakers and printers.

The computer 520 may operate in a networked environment using logical connections to one or more remote computers, such as remote computers 583 and 593. Remote computers 583 and 593 may each be another personal computer, a server, a as router, a network PC, a peer device or other common network node, and typically include many or all of the elements described above relative to the computer 520. The logical connections depicted in FIG. 5 include a local area network (LAN) 551 and a wide area network (WAN) 552 that are presented here by way of example and not limitation. Such networking environments are commonplace in office-wide or enterprise-wide computer networks, intranets and the Internet.

When used in a LAN networking environment, the computer 520 is connected to the local network 551 through a network interface or adapter 553. When used in a WAN networking environment, the computer 520 may include a modem 554, a wireless link, or other means for establishing communications over the wide area network 552, such as the Internet. The modem 554, which may be internal or external, is connected to the system bus 523 via the serial port interface 546. In a networked environment, program modules depicted relative to the computer 520, or portions thereof, may be stored in the remote memory storage device. It will be appreciated that the network connections shown are exemplary and other means of establishing communications over wide area network 552 may be used.

The present invention extends to both methods and systems for realizing legally binding business contracts. The embodiments of the present invention may comprise one or more special purpose and/or one or more general purpose computers including various computer hardware, as discussed in greater detail above.

The present invention also may be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of acts and/or steps.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a computing environment including a processing unit and storage media, a method of managing business interactions between opposing parties, the method comprising one or more computer processors performing acts of:

mapping the business interactions between a service provider and a service consumer to one or more service contracts, the service contracts defining various parameters that the service provider and service consumer agree to;

mapping the one or more service contracts to machine readable code, the service contracts defined by one or more business transaction patterns included in a finite set of business transaction patterns and one or more service interaction patterns, wherein the business transaction patterns comprise a finite set of management tasks with definable property values, such that any business interaction between the service provider and service consumer can be mapped to serialized machine readable code;

wherein the finite set of transaction patterns and management tasks include:

an offer and acceptance pattern, including at least a specification of a time to acknowledge receipt, a time to acknowledge acceptance, a time to perform, a specification that authorization is required, and a specification of non-repudiation of origin and content;

a query/response pattern, specifying at least a time to perform;

a request/response pattern, specifying at least a time to perform;

a request/confirm pattern specifying at least a time to perform;

an information distribution pattern specifying at least a time to acknowledge receipt and a time to perform; and a notification pattern, specifying at least a time to acknowledge receipt and a time to perform, reading the machine readable code in an IT system; and generating management tasks associated with fulfilling obligations required by the business interactions.

2. The method of claim 1, further comprising monitoring performance of management tasks.

3. The method of claim 1, wherein mapping the one or more service contracts to machine readable code comprises mapping the one or more service contracts to an XML code block for use in Web Services.

4. The method of claim 1, wherein mapping the business interactions to one or more service contracts comprises mapping the business interactions to a form document.

5. The method of claim 1, wherein mapping the business interactions to one or more service contracts comprises mapping terms and/or conditions of a contract and at least one of regulatory or common law requirements to the one or more service contracts.

6. The method of claim 1, wherein mapping the business interactions to one or more service contracts comprises mapping at least one of standardized legal requirements or best business practices to the one or more service contracts.

7. The method of claim 6, wherein the standardized legal requirements and/or best business practices are codified in at least one of UNECE UN/CEFACT Modeling Methodology (UMM) or ISO/JEC JTC1 SC32 WG1 Business Agreement Semantic Descriptive Techniques ISO/IEC FCD 15944-3.

8. The method of claim 1, wherein reading the machine readable code in an IT system comprises using the code to implement one or more phases of an IT service life cycle.

9. The method of claim 1, wherein mapping the one or more service contracts to machine readable code comprises mapping to at least one of a service definition or a service management model.

10. The method of claim 1, wherein mapping the business interaction to one or more service contracts comprises generating a service definition and a service commitment.

11. The method of claim 10, wherein the service definition defines a service implementation, wherein the service implementation defines at least one of service policies, service setting or service instrumentation.

12. The method of claim 11, wherein the service instrumentation defines at least one of events defining tasks to be performed, traces providing data for debugging and diagnostics, probes, or performance counters defining system health.

13. The method of claim 10, wherein the service commitment defines at least one of service operation rules or service fulfillment rules that are read by the service implementation.

14. The method of claim 13, wherein the at least one of service operation rules or service fulfillment rules comprise at least one of parameters, conditions reflecting the terms or conditions specified in the service contract, and actions.

15. The method of claim 14, wherein the actions comprise at least one of alerts or emails that trigger management tasks based on data from a service instrumentation.

16. A computer readable medium having computer executable instructions for performing the acts of:

mapping the business interactions between a service provider and a service consumer to one or more service contracts, the service contracts defining various parameters that the service provider and service consumer agree to;

mapping the one or more service contracts to machine readable code defined by one or more business transaction patterns included in a finite set of business transaction patterns and one or more service interaction patterns, wherein the business transaction patterns comprise a finite set of management tasks with definable property values, such that any business interaction between the service provider and service consumer can be mapped to serialized machine readable code;

wherein the finite set of transaction patterns and management tasks include:

an offer and acceptance pattern, including at least a specification of a time to acknowledge receipt, a time to acknowledge acceptance, a time to perform, a specification that authorization is required, and a specification of non-repudiation of origin and content;

a query/response pattern, specifying at least a time to perform;

a request/response pattern, specifying at least a time to perform;

a request/confirm pattern specifying at least a time to perform;

an information distribution pattern specifying at least a time to acknowledge receipt and a time to perform; and a notification pattern, specifying at least a time to acknowledge receipt and a time to perform reading the machine readable code in an IT system; and generating management tasks associated with fulfilling obligations required by the business interactions.

17. A computer readable medium including a plurality of data fields forming an IT system readable model of a service contract, that when read by a computing system facilitates one or more processors managing business interactions between opposing parties the computer readable medium comprising:

a service implementation, wherein the service implementation comprises:

service policies;

service settings; and service instrumentation, wherein the service instrumentation comprises:

events defining tasks to be performed;

traces providing data for debugging and diagnostics;

probes; and performance counters defining system health events;

a service commitment, wherein the service commitment comprises service operation rules and service fulfillment rules, the service operation rules and service fulfillment rules comprising:

parameters, conditions reflecting the terms and conditions specified in the service contract, the terms and conditions being specified, using one or more business transaction patterns included in a finite set of business transaction patterns, wherein the business transaction patterns comprise a finite set of management tasks with definable property values, such that any business interaction between the service provider and service consumer can be mapped to serialized machine readable code, wherein the finite set of transaction patterns and management tasks include:

an offer and acceptance pattern, including at least a specification of a time to acknowledge receipt, a time to acknowledge acceptance, a time to perform, a specification that authorization is required, and a specification of non-repudiation of origin and content;

a query/response pattern, specifying at least a time to perform;

a request/response pattern, specifying at least a time to perform;

a request/confirm pattern specifying at least a time to perform;

an information distribution pattern specifying at least a time to acknowledge receipt and a time to perform; and a notification pattern, specifying at least a time to acknowledge receipt and a time to perform; and actions, wherein the actions comprise at least one of alerts or emails that trigger management tasks based on data from a service instrumentation.

18. The method of claim 1, wherein the offer and acceptance pattern further comprises a specification of non-repudiation of receipt, the request confirm pattern further comprises a specification of non-repudiation of receipt, and the notification pattern further comprises a specification of non-repudiation of origin and content and a specification of non-repudiation of receipt.

* * * * *